Patented Jan. 23, 1934

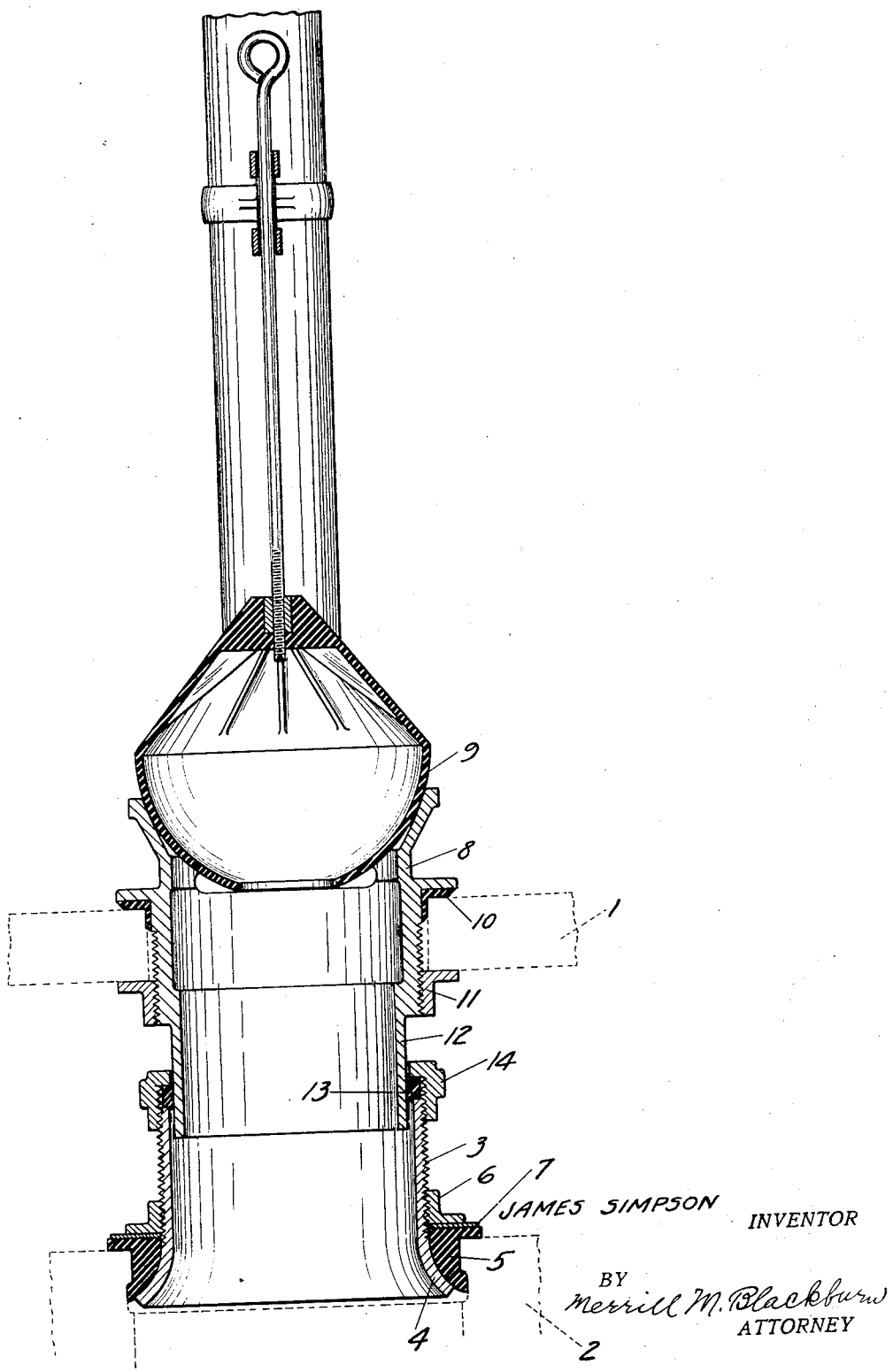

1,944,850

UNITED STATES PATENT OFFICE 1,944,850

SANITARY PLUMBING CONNECTION

James Simpson, Abingdon, Ill., assignor to Abingdon Sanitary Mfg. Co., Abingdon, Ill., a corporation of Illinois Application August 24, 1932. Serial No. 630,231

1 Claim. (Cl. 4—14)

The present invention relates to a new and improved connection for use in connection with sanitary plumbing and more especially the connection between the hardware of the tank and that of the bowl. Among the objects of my invention are to provide a simple easy mode of connecting the tank and bowl in fluid-conducting relation; to provide a less expensive mode of connecting the indicated parts than heretofore used; to provide a connection of the character indicated which will require less time for the making of the installation than constructions heretofore used; and such further objects, advantages and capabilities as will hereafter appear and as are inherent in the construction disclosed herein. My invention further resides in the combination, construction and arrangement of parts illustrated in the accompanying drawing and, while I have shown therein what is now considered the preferred embodiment of this invention, I desire the same to be understood as illustrative only and not to be interpreted in a limiting sense.

In the drawing annexed hereto and forming a part hereof, the single figure is a vertical longitudinal section through my new connection and shows the associated parts in their relation thereto.

Reference will now be made in greater detail to the annexed drawing, wherein the bottom of the tank and a part of the bowl are indicated in dotted lines and denoted, respectively, by the numerals 1 and 2. An externally screw-threaded sleeve 3 which flares outwardly at its lower end, as indicated at 4, slides freely into the provided opening in the bowl 2, as will be readily apparent from the drawing. Surrounding the sleeve 3 there is a gasket 5 which may and does expand into contact with the surrounding wall of the bowl when forced downwardly on the flared portion 4 of the sleeve by the nut 6 which is screwed downwardly on the threads of the sleeve 3. Between the gasket 5 and the nut 6 is a suitable washer 7, preferably formed of some kind of composition material, as fiber.

A sleeve 8, having at its upper end a tapered socket for the reception of the usual rubber valve member 9, passes downwardly through the bottom of the tank 1 and has a gasket 10 located between itself and the bottom of the tank to prevent leakage of water between them. A nut 11 is screwed on the external threads of the sleeve 8 and draws the gasket 10 into tight relation with the tank 1. The sleeve 8 is extended downwardly, as indicated at 12, and is surrounded by a gasket 13 and a nut 14. Preferably, the gasket 13 is a rubber ring which can be compressed between the upper end of the tube or pipe 3 and the under face the inwardly extending flange of the nut 14. Before the parts are connected, the nut 14 and ring 13 are placed about the extension 12 and are shoved far enough up to permit ready application of the extension 12 to the sleeve or tube 3. These two sleeves fit closely but not tightly so that it is an easy matter to place the tank above the bowl with the extension 12 of sleeve 8 in line with the sleeve 3 and then insert the extension 12 into the sleeve 3. When the tank reaches the proper height and is secured in place, the nut 14 can be tightened down on the sleeve 3, thus compressing the rubber ring 13 so as to prevent leakage at this point.

Having now described my invention, I claim:

A structure of the character indicated comprising a sleeve for attachment to a toilet bowl, a sleeve to be mounted in the bottom of a flush tank in water-tight relation therewith, said second mentioned sleeve serving as a part of the flush valve and having an extension of a size to slip easily into the first mentioned sleeve, a gasket surrounding the second mentioned sleeve adjacent to its normally lower end and a nut surrounding said extension and having an inwardly extending flange above the gasket and adapted to be drawn down on same, said nut and first mentioned sleeve being threadedly connected so that the nut can be screwed down on the sleeve to compress the gasket and form a water-tight connection between the two sleeves.

JAMES SIMPSON.